(12) United States Patent
Yoshida et al.

(10) Patent No.: US 8,310,608 B2
(45) Date of Patent: Nov. 13, 2012

(54) LIQUID CRYSTAL DEVICE AND ELECTRONIC APPARATUS

(75) Inventors: Shuhei Yoshida, Tottori (JP); Shinichiro Tanaka, Tottori (JP)

(73) Assignee: Sony Corporation, Tokyo (JP)

( * ) Notice: Subject to any disclaimer, the term of this patent is extended or adjusted under 35 U.S.C. 154(b) by 635 days.

(21) Appl. No.: 12/539,873

(22) Filed: Aug. 12, 2009

(65) Prior Publication Data
US 2010/0079693 A1  Apr. 1, 2010

(30) Foreign Application Priority Data

Sep. 30, 2008 (JP) ................................. 2008-252588
May 29, 2009 (JP) ................................. 2009-130078

(51) Int. Cl.
*G02F 1/1333* (2006.01)
*G02F 1/1343* (2006.01)
*G02F 1/1345* (2006.01)
*G02F 1/1335* (2006.01)

(52) U.S. Cl. ............ 349/40; 349/59; 349/141; 349/149; 349/106

(58) Field of Classification Search .................... 349/40, 349/59, 141, 149, 106
See application file for complete search history.

(56) References Cited

U.S. PATENT DOCUMENTS

| | | | |
|---|---|---|---|
| 6,346,932 B1 * | 2/2002 | Maeda | 345/90 |
| 7,633,566 B2 * | 12/2009 | Utsunomiya et al. | 349/12 |
| 8,004,644 B2 * | 8/2011 | Kurasawa | 349/141 |
| 2011/0102732 A1 * | 5/2011 | Washizawa | 349/187 |

FOREIGN PATENT DOCUMENTS

JP  A-2001-51263  2/2001

* cited by examiner

*Primary Examiner* — Mike Qi
(74) *Attorney, Agent, or Firm* — K&L Gates LLP (57) ABSTRACT

A lateral electric field mode liquid crystal device comprising: a first substrate having pixel electrodes and common electrodes which are provided on one surface thereof; a second substrate disposed so as to face that surface of the first substrate with a predetermined distance therebetween; a liquid crystal layer sandwiched between the first substrate and the second substrate; and a loop-shaped sealing member disposed so as to surround the liquid crystal layer, with the liquid crystal device driving the liquid crystal layer by an electric field generated between the pixel electrodes and the common electrodes.

6 Claims, 9 Drawing Sheets

LIQUID CRYSTAL DEVICE AND ELECTRONIC APPARATUS

BACKGROUND

1. Technical Field

The present invention relates to a liquid crystal device and an electronic apparatus.

2. Related Art

As a means for achieving a wide viewing angle of a liquid crystal device, an IPS (In-Plane Switching) mode, which is one example of a so-called lateral electric field mode, has been put into practical use, in which an electric field is generated in an in-plane direction (lateral direction) to a substrate, the lateral electric field causes liquid crystal molecules contained in a liquid crystal layer to be rotated in a plane parallel of the substrate, thus controlling the transmission of light. Further, an FFS (Fringe-Field Switching) mode is proposed as an improvement of the IPS mode.

Such a lateral electric field mode liquid crystal device has a configuration in which electrodes such as common electrodes and pixel electrodes or conductive members such as wirings are arranged on an element substrate having formed thereon driving elements such as TFT, whereas conductive members are not arranged on a counter substrate which is disposed close to the display surface. For this reason, there is a problem in terms of display quality in that such a liquid crystal device is likely to be affected by external electric fields outside of the counter substrate, typically static electricity, and thus, irregularities in liquid crystal display are likely to occur. In order to solve such a problem, a method has been proposed in which a transparent conductive film is formed on the side of the counter substrate so that static electricity is trapped in the transparent conductive film, thereby preventing display irregularities (see JP-A-2001-051263, for example).

JP-A-2001-051263 discloses a configuration of the counter substrate in which the transparent conductive film is provided on the outer side (the side opposite to the liquid crystal layer) of the glass substrate and a configuration in which the transparent conductive film is provided on the inner side (the side of the liquid crystal layer) of the glass substrate. When these configurations are compared, the counter substrate having the transparent conductive film on the inner side thereof has an advantage that it is easy to manufacture because the transparent conductive film can be formed by being laminated on members provided on the inner side such as an alignment film, and it is thus not necessary to reverse the glass substrate.

However, JP-A-2001-051263 discloses a configuration in which a conductive film provided on the inner side of the upper glass substrate (the counter substrate) and the common electrodes provided on the glass substrate (element substrate) are bonded together by a sealing portion so that both substrates are bonded together, and silver pastes are arranged around the sealing portion so that a vertical electrical connection between the conductive film and the common electrodes is realized. However, since adhesion is poor between metal materials or metal oxides and curable resin, which is the forming material of the sealing portion, the liquid crystal device is likely to be damaged due to peeling at the bonding surface, and reliability is likely to deteriorate. On the other hand, when the surface of the conductive film is covered with materials showing good adhesion with the sealing portion, the vertical electrical connection between the conductive film and the common electrodes cannot be realized.

SUMMARY

An advantage of some aspects of the invention is that it provides a liquid crystal device having high damage resistance and capable of suppressing image irregularities resulting from external static electricity. Another advantage of some aspects of the invention is that it provides an electronic apparatus including such a liquid crystal device.

The invention aims to solve at least part of the above-described problems and can be actualized as a form or an application described below.

Application 1

A lateral electric field mode liquid crystal device including: a first substrate having pixel electrodes and common electrodes which are provided on one surface thereof; a second substrate disposed so as to face that surface of the first substrate with a predetermined distance therebetween; a liquid crystal layer sandwiched between the first substrate and the second substrate; and a loop-shaped sealing member disposed so as to surround the liquid crystal layer, with the liquid crystal device driving the liquid crystal layer by an electric field generated between the pixel electrodes and the common electrodes, wherein on the surface of the first substrate disposed close to the liquid crystal layer, a driving circuit and wirings electrically connected to the driving circuit are formed, wherein on the surface of the second substrate disposed close to the liquid crystal layer, an electrostatic shielding layer and an insulating layer formed of resin materials are formed in this order, wherein the wirings and the electrostatic shielding layer are electrically connected via a conductive member which is formed in an exposed portion of the insulating layer at the outer circumference of the sealing member, and the potential of the electrostatic shielding layer is controlled to be at predetermined potential by the driving circuit.

According to such a configuration, the sealing member can reliably adhere on the insulating layer which is similarly formed of resin materials, preventing peeling at the bonding surface, realizing an electrical connection between the electrostatic shielding layer and the wirings, and allowing static electricity from the external environment trapped in the electrostatic shielding layer to be discharged to the side of the first substrate (element substrate). Due to such a configuration, it is possible to provide a liquid crystal device having high damage resistance and capable of suppressing image irregularities due to static electricity.

The exposed portion is formed by locally removing the insulating layer. Here, the meaning of "driving the liquid crystal layer" is that the alignment direction of the liquid crystal molecules contained in the liquid crystal layer is changed.

Application 2

The liquid crystal device according to Application 1, wherein the insulating layer is a laminate of a color filter layer and an overcoat layer formed on the side of the color filter layer disposed close to the liquid crystal layer, where the color filter layer includes a coloring layer which is formed so as to overlap with the pixel electrodes in a plan view, and a light shielding layer which is formed in an area where the coloring layer is not formed.

According to such a configuration, it is possible to further increase the distance between the electrostatic shielding layer and the liquid crystal layer. Due to such a configuration, it is possible to further reduce display irregularities resulting from static electricity.

Application 3

The liquid crystal device according to Application 1, wherein the insulating layer is a laminate of a coloring layer which is formed so as to overlap with the pixel electrodes in a plan view, and an overcoat layer which is formed on the side of the coloring layer disposed close to the liquid crystal layer.

According to such a configuration, an alignment mark can be formed when forming the light shielding layer, and the electrostatic shielding layer can be formed by a mask film forming method using the alignment mark. Due to such a configuration, the electrostatic shielding layer can be patterned without increasing the manufacturing cost, and reliability can be improved.

Application 4

The liquid crystal device according to Application 1, wherein a color filter layer is formed on the surface of the second substrate disposed close to the liquid crystal layer, where the color filter layer includes a coloring layer which is formed so as to overlap with the pixel electrodes in a plan view, and a light shielding layer which is formed in an area where the coloring layer is not formed, and wherein the insulating layer is an overcoat layer which is formed on the side of the color filter layer disposed close to the liquid crystal layer.

According to such a configuration, it is possible to prevent the thickness of the coloring layer from affecting the function of the electrostatic shielding layer, namely the function of shielding static electricity. Due to such a configuration, it is possible to obtain an easy-to-design liquid crystal device.

Application 5

The liquid crystal device according to Application 2, wherein the conductive member and the wirings are connected via a conductive film which is formed on the side of the wirings disposed close to the liquid crystal layer.

According to such a configuration, it is possible to prevent the liquation of foreign materials contained in the color filter layer due to the conductive film, and prevent display irregularities in the liquid crystal layer.

Application 6

An electronic apparatus comprising the liquid crystal device according to Application 1.

According to such a configuration, it is possible to provide an electronic apparatus having the liquid crystal device free from display irregularities resulting from static electricity in the external environment and capable of displaying high-quality images.

BRIEF DESCRIPTION OF THE DRAWINGS

The invention will be described with reference to the accompanying drawings, whereinlike numbers reference like elements.

DESCRIPTION OF EXEMPLARY EMBODIMENTS

First Embodiment

A liquid crystal device 1 according to a first embodiment of the invention will be described herein below with reference to FIGS. 1 to 5. In the drawings below, individual members are appropriately depicted with different thicknesses and measurements in order to make them recognizable in the drawings.

The liquid crystal device according to the present embodiment displays images by controlling the azimuth angle of liquid crystal molecules by using a lateral electric field perpendicular to the light traveling direction. An IPS (In-Plane Switching) mode and an FFS (Fringe-Field Switching) mode are known as examples of such a lateral electric field mode. Although the descriptions below are based on a liquid crystal device capable of performing full-color display in liquid crystal devices employing an FFS mode driving method, the invention can be equally applied to an IPS mode liquid crystal device.

Figure 1:
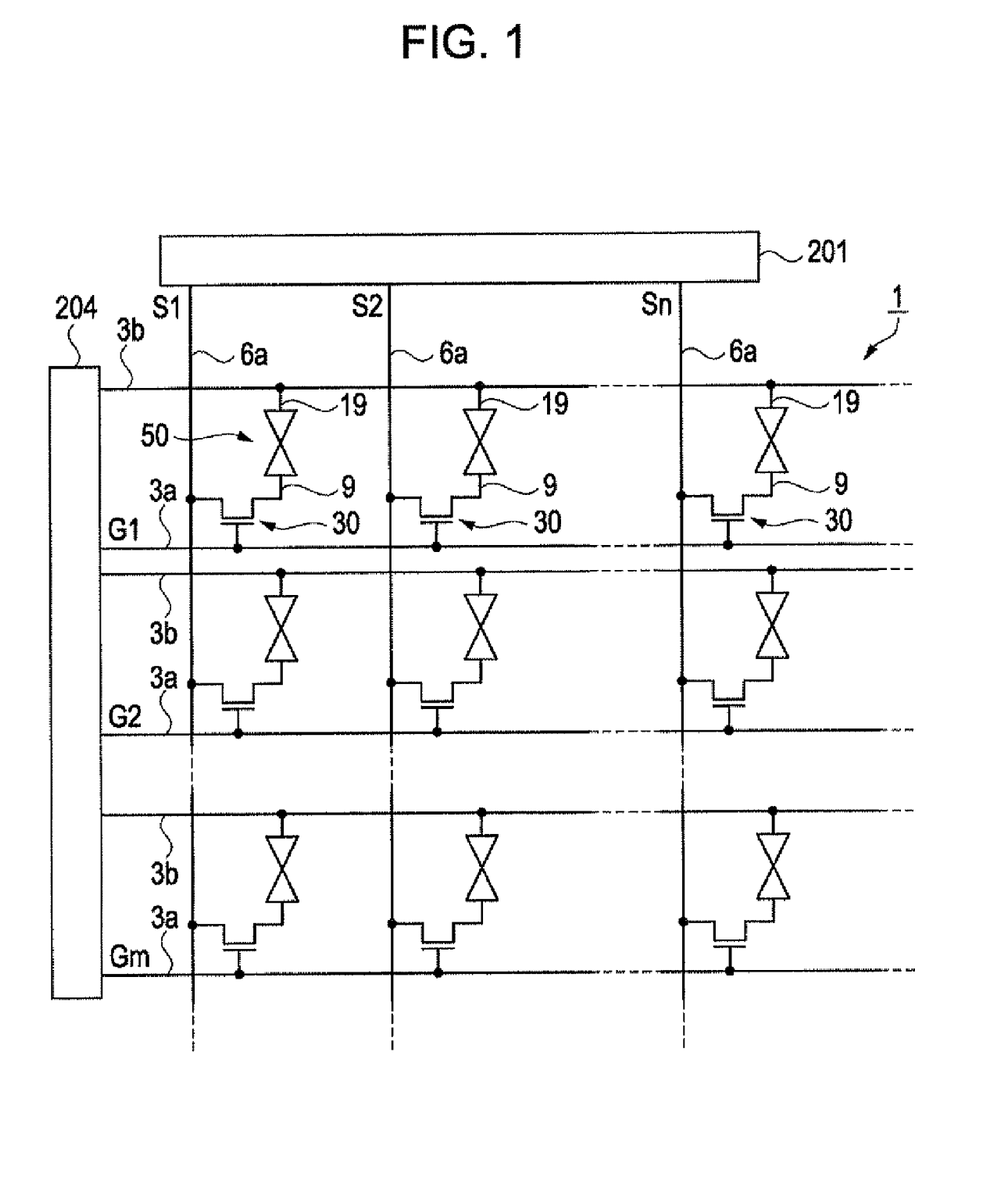
FIG. 1 is an equivalent circuit diagram of a liquid crystal device according to a first embodiment of the invention.

FIG. 1 is an equivalent circuit diagram of a liquid crystal device 1 according to the present embodiment. In a plurality of sub-pixel areas which is formed in a matrix and constitutes the image display area of the liquid crystal device 1, pixel electrodes 9 and thin film transistors (TFTs) 30 for switching the pixel electrodes 9 are formed. A liquid crystal layer 50 is disposed between the pixel electrodes 9 and common electrodes 19. The common electrodes 19 are electrically connected to common lines 3b which extend from a scanning line-driving circuit 204 and are maintained at the same potential in a plurality of sub-pixels.

Data lines 6a which extend from a data line-driving circuit 201 are electrically connected to the sources of the TFTs 30. The data line-driving circuit 201 supplies image signals S1, S2, ..., and Sn to the respective sub-pixels via data lines 6a. The image signals S1 to Sn may be supplied in this order in a line-sequential manner and may be supplied for each group of a plurality of neighboring data lines 6a.

Moreover, scanning lines 3a which extend from the scanning line-driving circuit 204 are electrically connected to the gates of the TFTs 30. Scanning signals G1, G2, ..., and Gm are supplied in a pulsating manner at predetermined time intervals from a scanning line-driving circuit 204 to the scanning lines 3a. The scanning signals G1 to Gm are applied in this order to the gates of the TFTS 30 in a line-sequential manner.

The pixel electrodes 9 are electrically connected to the drains of the TFTs 30. When the TFTs 30 which are switching elements are turned on for only a predetermined time period in response to the input of the scanning signals G1, G2, ..., and Gm, the image signals S1, S2, ..., and Sn supplied from the data lines 6a are written to the pixel electrodes 9 at predetermined time intervals. The image signals S1, S2, ..., and Sn of a predetermined level, which have been written to the liquid crystal layer 50 via the pixel electrodes 9, are held for a predetermined time period between the pixel electrodes 9 and the common electrodes 19 facing the pixel electrodes 9 with the liquid crystal layer 50 disposed therebetween.

Figure 2:
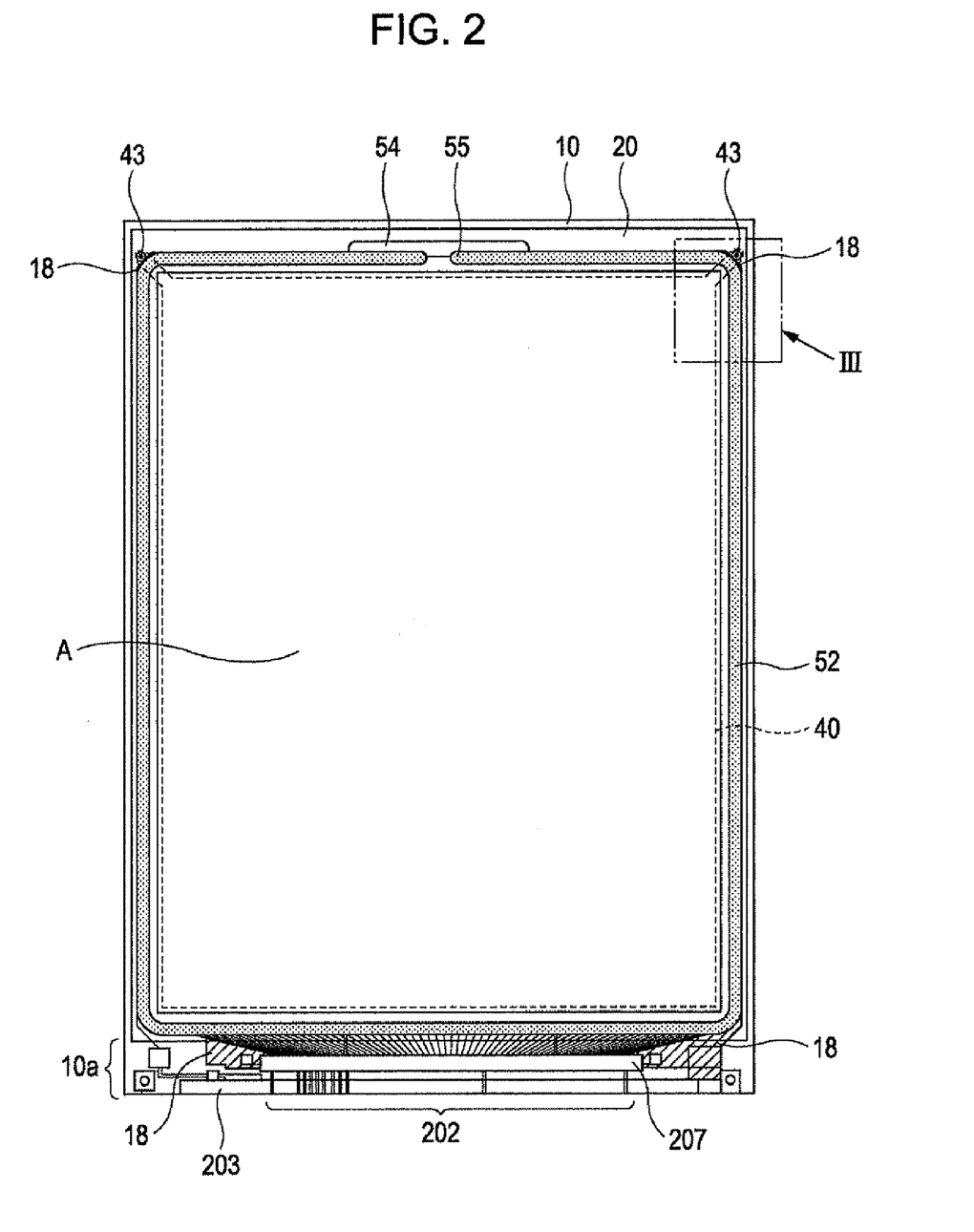
FIG. 2 is a plan view of the liquid crystal device according to the first embodiment, as viewed from the side of a counter substrate.
Figure 3:
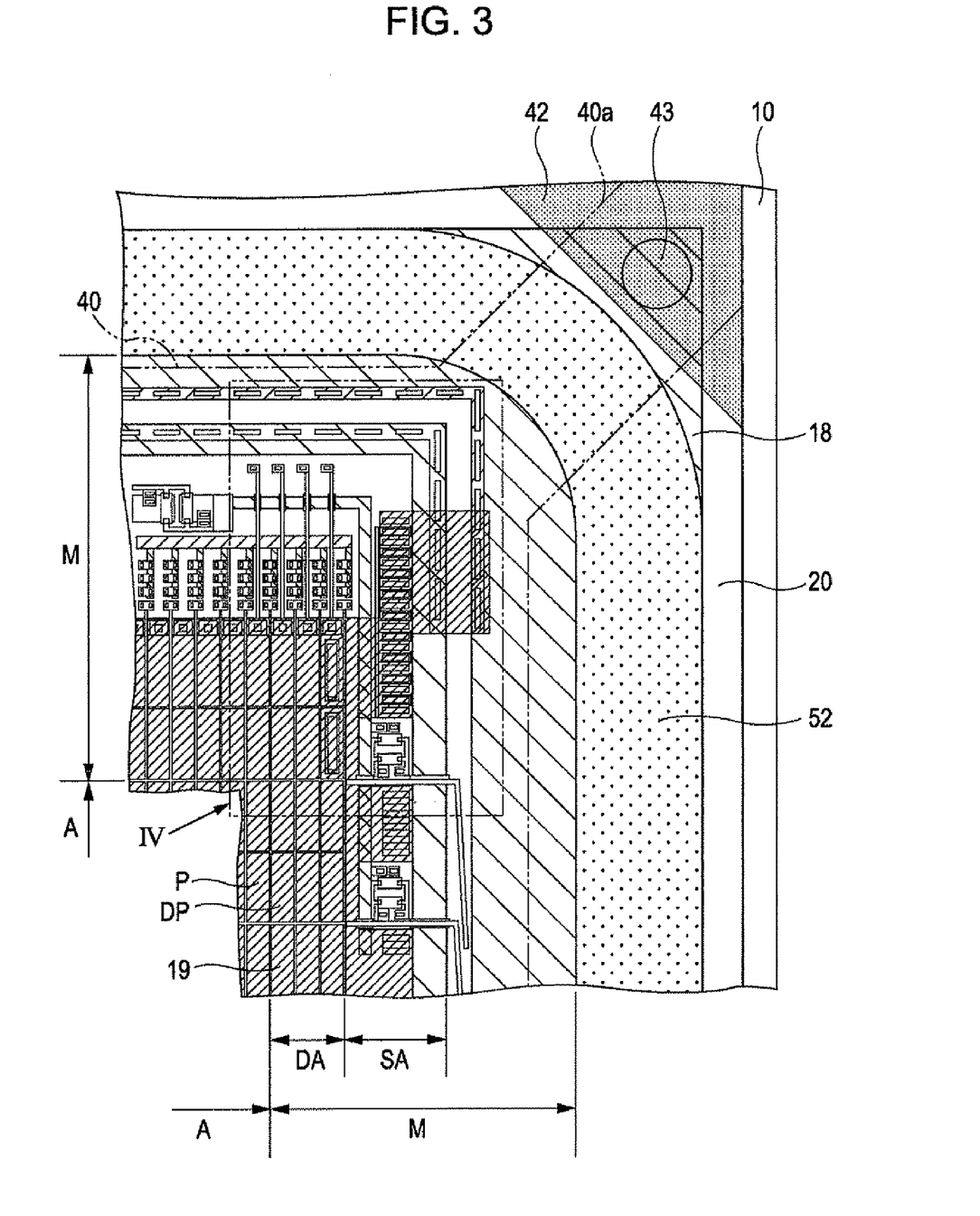
FIG. 3 is an enlarged view of a partial area in FIG. 2.
Figure 4:
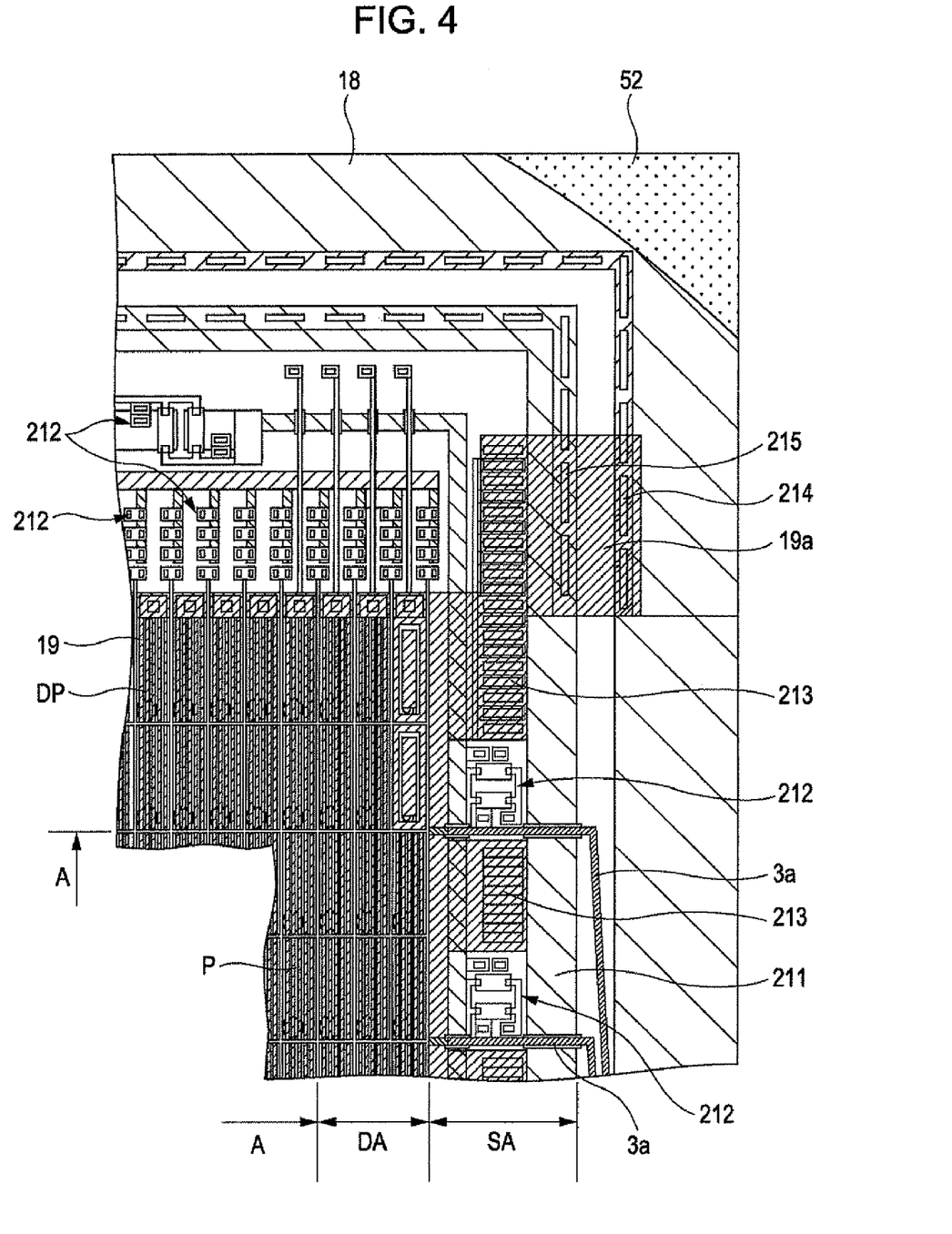
FIG. 4 is an enlarged view of a partial area in FIG. 3.

FIGS. 2 to 4 are plan views of the liquid crystal device 1 according to the present embodiment, as viewed from the side of a counter substrate 20 as the second substrate, in which FIG. 3 is an enlarged view of a partial area in FIG. 2, and FIG. 4 is an enlarged view of a partial area in FIG. 3.

As illustrated in FIG. 2, the liquid crystal device 1 according to the present embodiment has a configuration in which an element substrate (first substrate) 10 and a counter substrate (second substrate) 20 are bonded together by a sealing member 52 at the peripheral edge portion of a planarly overlapping portion, and liquid crystal molecules are filled and held in an area (display area A) defined by the sealing member 52. In the sealing member 52, a liquid crystal inlet 55 is formed for filling liquid crystal molecules after the element substrate 10 and the counter substrate 20 are bonded together during the manufacturing steps, and the liquid crystal inlet 55 is sealed by a sealing material 54 after filling the liquid crystal molecules. In an area on the inner surface side of the element substrate 10 planarly overlapping with the display area A, non-illustrated pixel electrodes and common electrodes are formed. In an area on the inner surface side of the element substrate 10 planarly overlapping with the sealing member 52, drawing lines 18 are provided.

In a portion (substrate extension portion 10a) at one end side of the element substrate 10 extended from the overlapping portion of the element substrate 10 and the counter substrate 20, a driving IC 207 is mounted for processing driving signals for driving the liquid crystal device 1 and appropriately supplying the processed driving signals, and input terminals 202 are formed at the end portion of the driving IC 207. On the input terminals 202, an FPC (Flexible Printed Circuit) board having wirings formed thereon is mounted via an anisotropic conductive film 203, for example, so that an external power supply or various external devices can be connected thereto.

On the inner surface side of the counter substrate 20, a later-described electrostatic shielding layer 40 is provided so as to be electrically connected to the drawing lines 18 of the element substrate 10 via a conductive member 43 which is arranged in at least one of the corner portions of the counter substrate 20. In the liquid crystal device 1 according to the present embodiment, the conductive member 43 is provided at two locations; at both ends of the edge on the other side (the side facing the edge close to the driving IC 207) of the element substrate 10. In the liquid crystal device 1, other elements such as retardation plates and polarization plates, which are omitted in this disclosure, are arranged in a predetermined direction according to necessity.

FIG. 3 is an enlarged view of an area III surrounded by the two-dot chain line in FIG. 2. In this drawing, the configuration on the side of the element substrate 10 and the configuration of an exposed portion 42 of the electrostatic shielding layer 40 formed at the corner portion on the side of the counter substrate 20 are illustrated.

As illustrated in the drawing, in the display area A, a plurality of sub-pixels P, which have an approximately rectangular shape in a plan view, is arranged in a matrix so as to extend in vertical and lateral directions. Moreover, a non-display area M is defined around the display area A at the inner side of the sealing member 52. In the non-display area M, an electrostatic protection area SA is provided for discharging static electricity entering from the drawing lines 18 to protect the sub-pixels P arranged on the display area A, and a dummy area DA is provided which has arranged thereon dummy pixels (electrostatic protection members) DP for protecting the sub-pixels P due to them being destroyed by the static electricity which is not discharged in the electrostatic protection area SA. In the element substrate 10 around the display area A, the drawing lines 18 are formed so as to overlap with the sealing member 52 and supply common potential to the common electrodes 19.

The electrostatic shielding layer 40 in the counter substrate 20 protrudes to the outer side of the sealing member 52 at the corner portion of the substrate. The protruding portion is a connecting portion 40a. Moreover, an exposed portion 42 is formed by removing a later-described light shielding layer 22b or the like (see FIG. 5) in the corner portion of the counter substrate 20. Therefore, the surface of the connecting portion 40a is exposed in the exposed portion, As illustrated in the drawing, the drawing lines 18 are formed to reach a portion of the exposed portion 42, namely, the outer side of the sealing member 52 in a plan view. Therefore, the drawing lines 18 and the surface of the exposed connecting portion 40a overlap with each other on a partial area of the exposed portion 42 in a plan view. The electrostatic shielding layer is electrically connected to the drawing lines 18 in this area via the conductive member 43. Therefore, the potential of the electrostatic shielding layer 40 is maintained at the same level as the common potential.

FIG. 4 is an enlarged view of an area IV surrounded by the two-dot chain line in FIG. 3. As illustrated in the drawing, in the non-display area M (see FIG. 3), the dummy area DA is provided which has a plurality of dummy pixels DP arranged around the sub-pixels P, and the electrostatic protection area SA is provided which has short rings (electrostatic protection members) 211 or resistive elements (electrostatic protection members) 212 which are arranged in an area disposed between the dummy area DA and the sealing member 52. The short rings 211 and the resistive elements 212 on the electrostatic protection area SA are provided to protect the TFTs 30 (see FIG. 1) arranged for each sub-pixel P from static electricity mainly generated during the manufacturing steps.

The static electricity generated during manufacturing steps enters into the sub-pixels P from the periphery of the display area A. Therefore, the generated static electricity is discharged by the function of the electrostatic protection area SA, and the sub-pixels P are prevented from being destroyed by the dummy pixels DP arranged in the dummy area DA which are destroyed by the static electricity which is not discharged.

The resistive elements 212 are provided so as to correspond to the rows and columns of the sub-pixels P and the dummy pixels DP and disposed at the end of each row and each column. In the drawing, the resistive elements 212 are alternately disposed for every one row of the sub-pixels P and the dummy pixels DP (on the even rows from the uppermost row) and are connected to the scanning lines 3a on respective rows. Although not illustrated, the resistive elements 212 corresponding to the remaining rows (ODD rows) are also provided on the left edge facing the illustrated right edge. Moreover, the resistive elements 212 are also provided for each column at the upper ends of the columns of the sub-pixels P and the dummy pixels DP.

The common electrodes 19 are formed so as to cover the sub-pixels P and the dummy pixels DP, and extension portions 213 for connection to the short rings 211 are provided at the end portions thereof on the side where the resistive elements 212 are arranged. The extension portions 213 are disposed at positions where they do not overlap with the resistive elements 212, and the common electrodes 19 and the short rings 211 are connected via the extension portions 213.

In the extension portions 213 provided at the upper corner portions of the common electrodes 19, connecting portions 19a having an approximately rectangular shape in a plan view are provided for connection to the drawing lines 18, and the common electrodes 19 and the drawing lines 18 are connected via a plurality of contact holes 214. Moreover, the connecting portions 19a are also connected to the short rings 211 via a plurality of contact holes 215. By these members provided on the electrostatic protection area SA, the electrostatic breakdown of the TFTs 30 provided in the sub-pixels P are prevented.

The electrostatic shielding layer 40 is provided so as to planarly overlap with each of the members of the dummy area DA and the electrostatic protection area SA. The electrostatic shielding layer 40 has a function for trapping external static electricity as described later and is thus able to prevent the respective members of the dummy area DA and the electrostatic protection area SA from being destroyed by the static electricity. Due to such a configuration, it is possible to effectively prevent the sub-pixels P from being destroyed in the dummy area DA and the electrostatic protection area SA. Moreover, since the electrostatic shielding layer 40 is electrically connected to the respective members of the dummy area DA and the electrostatic protection area SA, they are able to cooperation in the diffusion of the static electricity.

Figure 5:
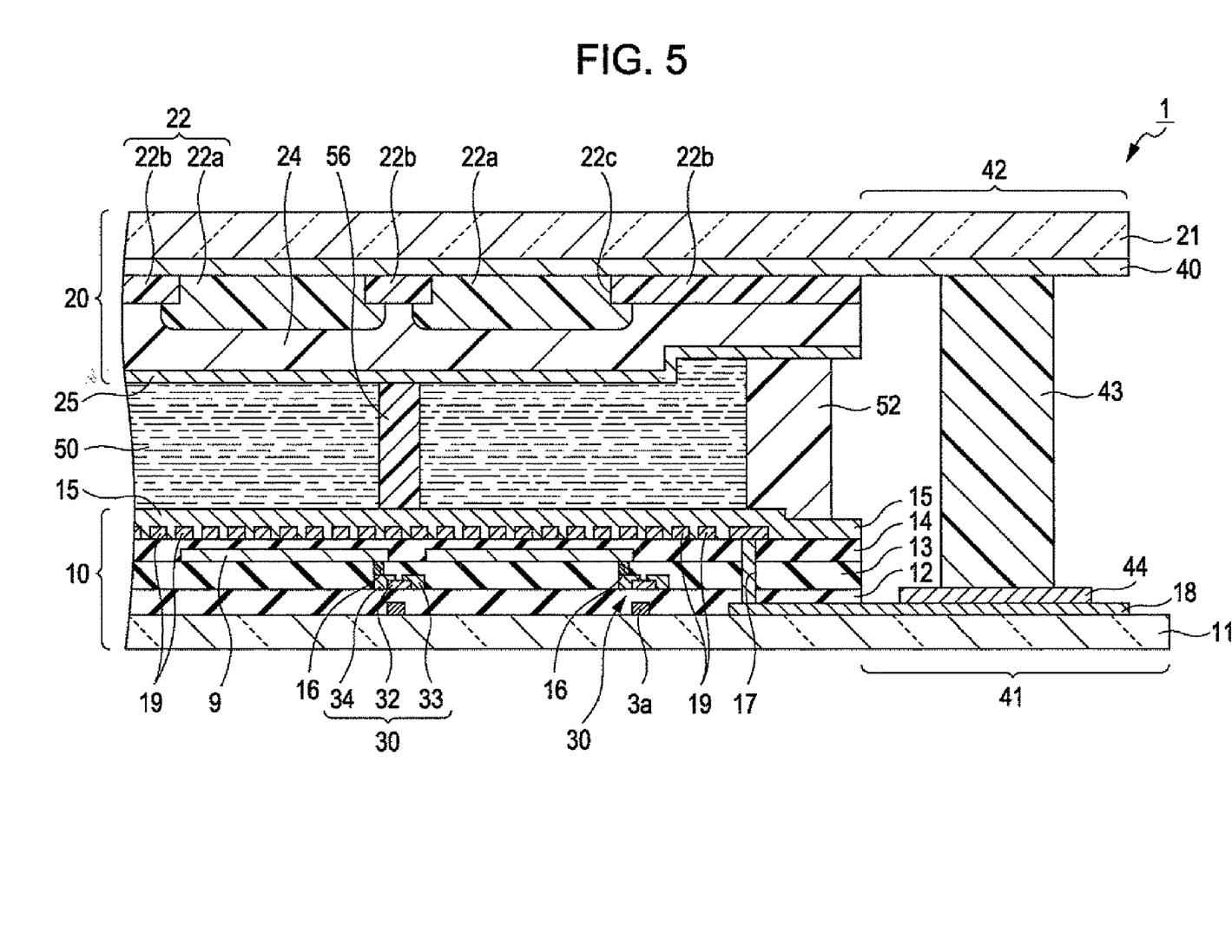
FIG. 5 is a simplified cross-sectional view of the peripheral portions of a sealing member and a conductive member of the liquid crystal device according to the first embodiment.

FIG. 5 is a simplified cross-sectional view of the peripheral portions of the sealing member 52 and the conductive member 43 of the liquid crystal device 1 according to the present embodiment. In this drawing, the configurations of the non-display area are not illustrated to enable better understanding of the drawing.

As illustrated in the drawing, the liquid crystal device 1 is configured to include the element substrate 10, the counter substrate 20 disposed to face the element substrate 10, and the liquid crystal layer 50 sandwiched between the element substrate 10 and the counter substrate 20. Moreover, the sealing member 52 is provided to the liquid crystal device 1 along the edge of an area where the element substrate 10 and the counter substrate 20 face each other, and the liquid crystal molecules constituting the liquid crystal layer 50 are sealed in the sealing member 52. The liquid crystal device 1 has such a configuration that illumination light is irradiated from the side of the element substrate 10, and displayed images are observed from the side of the counter substrate 20.

The element substrate 10 includes an element substrate body 11 having transparent properties. As materials for forming the element substrate body 11, inorganic materials such as glass, quartz glass, or silicon nitrides or organic polymeric compounds (resin) such as acrylic resin or polycarbonate resin can be used. Moreover, composite materials obtained by laminating or mixing such materials may be used if they have transparent properties.

On a surface of the element substrate body 11 disposed close to the liquid crystal layer 50, the scanning lines 3a and the non-illustrated data lines which are formed of conductive materials such as aluminum or copper are formed. In an area planarly overlapping with the sealing member 52, the drawing lines 18 similarly formed of conductive materials are formed. These lines may be formed of the same materials and may be formed of different materials. These lines can be obtained by forming a thin film of conductive materials and then patterning the thin film, for example. In the present embodiment, aluminum is used as the forming material.

On the element substrate body 11, a gate insulating film 12 is formed so as to cover the scanning lines 3a, the data lines, and the drawing lines 18. The gate insulating film 12 is formed of transparent materials with insulating properties such as silicon nitrides or silicon oxides.

On the gate insulating film 12, a semiconductor layer 32, a source electrode 33 connected to one end of the semiconductor layer 32, and a drain electrode 34 connected to the other end of the semiconductor layer 32 are formed, whereby a bottom-gate type TFT 30 is constructed by the semiconductor layer 32, the source electrode 33, the drain electrode 34, and the scanning line 3a. Moreover, an interlayer insulating film 13 is formed so as to cover the TFTs 30. The interlayer insulating film 13 is formed of transparent materials with insulating properties such as silicon nitrides or silicon oxides, similar to the gate insulating film 12.

The pixel electrodes 9 are formed on the interlayer insulating film 13 and are electrically connected to the drain electrodes 34 of the TFTs 30 via contact holes 16. The pixel electrodes 9 are formed of conductive materials with transparent properties such as ITO (Indium Tin Oxide) or tin oxides ($SnO_2$). In the present embodiment, ITO is used.

On the interlayer insulating film 13, an inter-electrode insulating film 14 is formed so as to cover the pixel electrodes 9. The inter-electrode insulating film 14 is formed of transparent materials with insulating properties such as silicon nitrides or silicon oxides, similar to the gate insulating film 12 and the interlayer insulating film 13, and is configured to cover the pixel electrodes 9 formed on the interlayer insulating film 13.

Ladder-shaped common electrodes 19 are formed on the inter-electrode insulating film 14. The pixel electrodes 9 and the common electrodes 19 are disposed with the inter-electrode insulating film 14 disposed therebetween, thereby constructing an FFS mode electrode structure. The common electrodes 19 are connected to the drawing lines 18 via contact holes 17 which pass through the gate insulating film 12, the interlayer insulating film 13, and the inter-electrode insulating film 14. The common electrodes 19 are formed of conductive materials with transparent properties such as ITO, and ITO is used as the material of the common electrodes 19 in the present embodiment.

On the inter-electrode insulating film 14, a first alignment film 15 is formed so as to cover the common electrodes 19. The first alignment film 15 is formed of organic materials such as polyimide or inorganic materials such as, for example, silicon oxides. The first alignment film 15 according to the present embodiment can be obtained by applying a material for forming polyimide, drying and curing the material, and then applying a rubbing process on the upper surface thereof.

On the other hand, the counter substrate 20 includes a counter substrate body 21 having transparent properties. The counter substrate body 21 can be formed of the same material as the element substrate body 11.

On a surface of the counter substrate body 21 disposed close to the liquid crystal layer 50, the electrostatic shielding layer 40 is formed so as to cover the entire surface of the display area A, the dummy area DA, and the electrostatic protection area SA, as illustrated in FIG. 3. The electrostatic shielding layer 40 is provided to trap external static electricity and release the trapped static electricity via the later-described conductive members 43, thereby preventing an unexpected vertical electric field from being generated between the counter substrate 20 and the element substrate 10. The electrostatic shielding layer 40 is formed of conductive materials having transparent properties such as ITO or $SnO_2$, and in the present embodiment, ITO is used as the forming material.

On the surface of the electrostatic shielding layer 40 disposed close to the liquid crystal layer 50, a color filter layer 22 including a coloring layer 22a and a light shielding layer 22b is formed. The color filter layer 22 is formed by forming the light shielding layer 22b patterned into a grid shape using the well-known method that uses acrylic resin mixed with a black pigment or low-reflection chrome and then arranging the forming materials of the coloring layer 22a in openings 22c formed by the patterning using a wet-coating method such as an ink-droplet ejection method. In the liquid crystal device 1 according to the present embodiment, the light shielding layer 22b is formed of acrylic resin having a black pigment mixed therein.

In the present embodiment, the thickness of the coloring layer 22a is 2 μm, and the thickness of the light shielding layer 22b is 1.5 μm. The color filter layer 22 modulates light entered from the side of the element substrate 10 and emitted to the side of the counter substrate 20 into red light, green light, and blue light, and mixes the light of the respective colors, thereby enabling full-color display.

An overcoat layer 24 formed of insulating materials is formed on the color filter layer 22. The overcoat layer 24 has a function of physically and chemically protecting the color filter layer 22. The overcoat layer 24 also prevents low molecular materials or ionic impurities such as reaction residues from the curing agent contained in the respective forming materials from being liquated from the formed coloring layer 22a or the light shielding layer 22b into the liquid crystal layer 50, thus preventing display irregularities. The overcoat layer 24 is formed of curable resin having transparent properties such as, for example, acrylic resin or epoxy resin. In the liquid crystal device 1 according to the present embodiment, acrylic resin is used and the overcoat layer 24 has a thickness of 2 μm.

On the surface of the overcoat layer 24 disposed close to the liquid crystal layer 50, a second alignment film 25 formed of the same material as the first alignment film 15 is formed in an area planarly overlapping with the liquid crystal layer 50. The second alignment film 25 according to the present embodiment can be obtained by applying a material for forming polyimide, drying and curing the material, and then applying a rubbing process on the upper surface thereof in a predetermined direction. The alignment direction of the second alignment film 25 during the rubbing process is set to be identical to the alignment direction of the first alignment film 15.

On areas of the overcoat layer 24 overlapping with the liquid crystal layer 50, disposed close to the liquid crystal layer 50, spacers 56 are formed in at least a portion of the areas overlapping with the light shielding layer 22b. The spacers 56 are provided to maintain a predetermined separation distance between the element substrate 10 and the counter substrate 20. For instance, even when stress is applied from the side of the counter substrate 20, since the thickness of the liquid crystal layer 50 won't become smaller than the height of the spacers 56, it is possible to prevent display irregularities.

The drawing lines 18 provided on the element substrate 10 and the electrostatic shielding layer 40 provided on the counter substrate 20 are electrically connected via the conductive members 43 in an area outside (side opposite to the liquid crystal layer 50) of the sealing member 52 surrounding the liquid crystal layer 50. The conductive members 43 are formed of curable resin having conductive fine particles mixed therein, silver pastes, or the like. The conductive fine particles may be fine metal particles of Au or Ag, non-conductive fine particles coated with conductive materials such as metal, or the like.

On areas of the element substrate 10 where the conductive members 43 are arranged, element substrate corner portions 41 are formed in which a total of three layers of the gate insulating film 12, the interlayer insulating film 13, and the inter-electrode insulating film 14 are removed, and the drawing lines 18 are partially exposed to the bottom portion thereof.

Since the drawing lines 18 according to the present embodiment are formed of aluminum, when they are exposed through the element substrate corner portions 41, the surfaces thereof may be oxidized to form an oxide film thereon, so that there are concerns that it might be unable to realize electrical connection. Moreover, in the liquid crystal device 1 according to the present embodiments since only portions of the drawing lines 18 are exposed to the bottom portions of the element substrate corner portions 41, the contact surface area with the conductive members 43 is small. Therefore, in order to prevent the surface oxidation of the drawing lines 18 and realize a reliable electrical connection to the conductive members 43, a conductive film 44 is formed so as to cover at least a portion of the surfaces of the drawing lines 18 which are exposed because of the configuration of element substrate corner portions 41. The conductive film 44 is preferably formed of ITO or $SnO_2$.

Moreover, on areas of the counter substrate 20 where the conductive members 43 are arranged, exposed portions 42 are formed in which the light shielding layer 22b and the overcoat layer 24 are removed.

The liquid crystal device 1 according to the present embodiment has the above-mentioned configuration. In the liquid crystal device 1 having the above-mentioned configuration, the sealing member 52 can reliably adhere on the overcoat layer 24, thus preventing peeling while realizing electrical connection between the electrostatic shielding layer 40 and the conductive members 43, and allowing static electricity trapped in the electrostatic shielding layer 40 to be discharged to the side of the element substrate 10. Due to such a configuration, it is possible to provide the liquid crystal device 1 having high damage resistance and capable of suppressing image irregularities due to static electricity.

Moreover, the exposed portions 42 are formed on the outer side of the area surrounded by the sealing member 52 and do not overlap with the liquid crystal layer 50. Due to such a configuration, it is possible to prevent impurities contained in the color filter layer 22 from being liquated into the liquid crystal layer 50 via the exposed portion 42, thus preventing display irregularities.

Moreover, in the liquid crystal device 1 according to the present embodiment, although the electrostatic shielding layer 40 is electrically connected to the drawing lines 18, the invention is not limited to this. For example, the common electrodes 19 may be formed so as to extend to the outside of the sealing member 52 so that the electrostatic shielding layer 40 is electrically connected to the common electrodes 19. Moreover, an additional conduction member may be provided for discharging static electricity charged to the electrostatic shielding layer 40.

Furthermore, in the present embodiment, although the electrostatic shielding layer 40 is connected to the common electrodes 19 so as to be controlled at the common potential, the invention is not limited to this. For example, additional wirings maintained at the GND potential may be formed, and the electrostatic shielding layer 40 may be connected to the wirings, so that the electrostatic shielding layer 40 is maintained at the GND potential.

Second Embodiment

Figure 6:
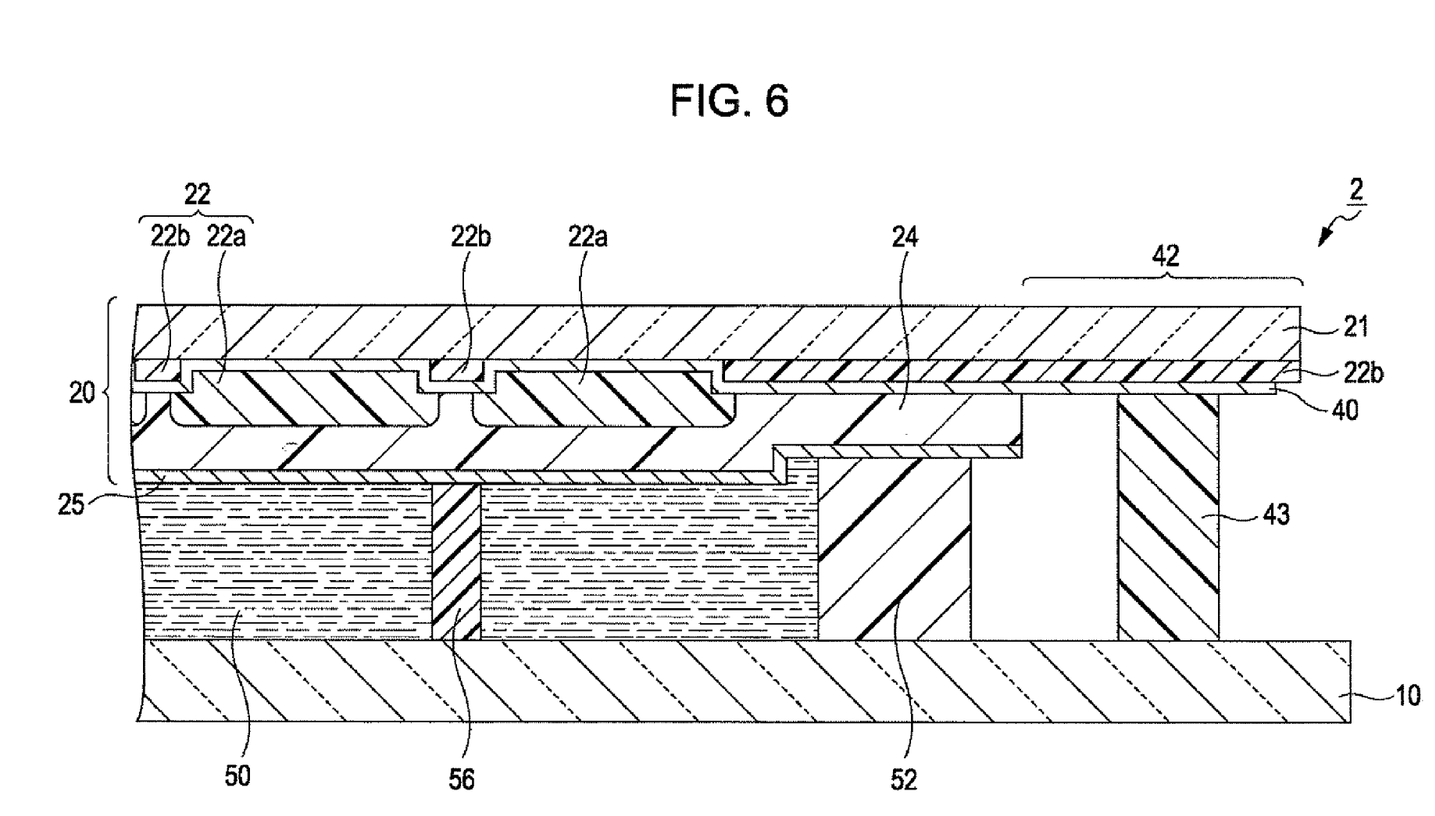
FIG. 6 is a simplified crosssectional view of a liquid crystal device according to a second embodiment of the invention.

Next, a liquid crystal device 2 according to a second embodiment of the invention will be described. FIG. 6 is a simplified cross-sectional view of the liquid crystal device 2 according to the second embodiment of the invention, which corresponds to FIG. 5 in the first embodiment. Therefore, the configurations of the non-display area are not illustrated.

The liquid crystal device 2 according to the present embodiment has a similar configuration to the liquid crystal device 1 according to the first embodiment, except that the light shielding layer 22b, the coloring layer 22a, and the electrostatic shielding layer 40 are arranged differently on the counter substrate 20. In the descriptions of the present embodiment, drawings corresponding to FIGS. 1 to 4 are omitted. For the same reason, the respective elements formed on the element substrate body 11, such as TFTs 30, will be omitted, and only the element substrate 10 will be illustrated.

As illustrated in the drawing, the electrostatic shielding layer 40 of the liquid crystal device 2 is formed so as to cover the surface of the counter substrate body 21 and the light shielding layer 22b, and the coloring layer 22a is formed on the surface of the electrostatic shielding layer 40 disposed close to the liquid crystal layer 50. On the surface of the counter substrate 20, the exposed portions 42 are formed in which the overcoat layer 24 is removed, so that the electrostatic shielding layer 40 and the conductive members 43 are electrically connected at the exposed portions 42. Unlike the liquid crystal device 1, the light shielding layer 22b is formed between the electrostatic shielding layer 40 and the counter substrate body 21 within the exposed portions 42. Therefore, the surface of the electrostatic shielding layer 40 has an uneven shape resembling the shape of the light shielding layer 22b which serves as an underlying layer. Due to such a configuration, the liquid crystal device 2 can provide high damage resistance and suppress image irregularities due to static electricity.

By having such exposed portions 42, the following advantages can be expected. When the conductive fine particles of the conductive members 43 have a diameter corresponding to the separation distance between the drawing lines 18 (see FIG. 5) or the conductive film 44 (see FIG. 5) of the element substrate 10 and the bottom portions of the exposed portions 42, the diameter of the conductive fine particles is larger than the diameter of the approximately spherical spacers of the sealing member 52 by an amount as same as the depth of the exposed portions 42. In such a case, when the exposed portions 42 have a depth corresponding to the sum of the thickness of the overcoat layer 24 and the thickness of other layers (e.g., the light shielding layer 22b), the difference in diameter of the conductive fine particles and the spacers will increase, thus increasing the gap variations when the conductive members 43 are misaligned. However, according to the configuration of the present embodiment, since there only occurs a gap variation corresponding to the thickness of the overcoat layer 24, it is possible to obtain a liquid crystal device in which the gap control is easy.

Moreover, the exposed portions 42 exposing the electrostatic shielding layer 40 to the bottom portions thereof are configured to have a depth corresponding to the thickness of the overcoat layer 24. Due to such a configuration, it is not necessary to perform processing on the light shielding layer 22b, and the overall processing is easy to perform.

Furthermore, the liquid crystal device 2 according to the present embodiment is advantageous in that the electrostatic shielding layer 40 can be formed by a mask film forming method. As illustrated in FIG. 6, the light shielding layer 22b is formed between the counter substrate body 21 and the electrostatic shielding layer 40. As described above, the light shielding layer 22b is formed by patterning an acrylic resin layer or a low-reflection chrome layer which is formed on the front surface of the counter substrate body 21. By forming alignment marks (not illustrated) simultaneously with the openings 22c (see FIG. 5) during the patterning, it is possible to apply a mask film forming method that masks the counter substrate body 21 when forming the electrostatic shielding layer 40 on the light shielding layer 22b so that a film is formed on a local area of the counter substrate body 21. Therefore, as illustrated in the drawing, the end face of the electrostatic shielding layer 40 can be positioned on the inner side of the outer circumferential line of the counter substrate body 21 in a plan view.

If the end face is identical to the outer circumferential line, namely they are even with each other, there might occur an unfavorable state such that the electrostatic shielding layer 40 is corroded or static electricity can easily enter therein. However, in the liquid crystal device 2 according to the present embodiment, since the end face of the electrostatic shielding layer 40 is positioned on the inner side of the outer circumferential line of the counter substrate body 21, the risk of the corrosion or the entering of static electricity is reduced. Therefore, according to the configuration of the present embodiment, it is possible to obtain a liquid crystal device having improved reliability.

Third Embodiment

Figure 7:
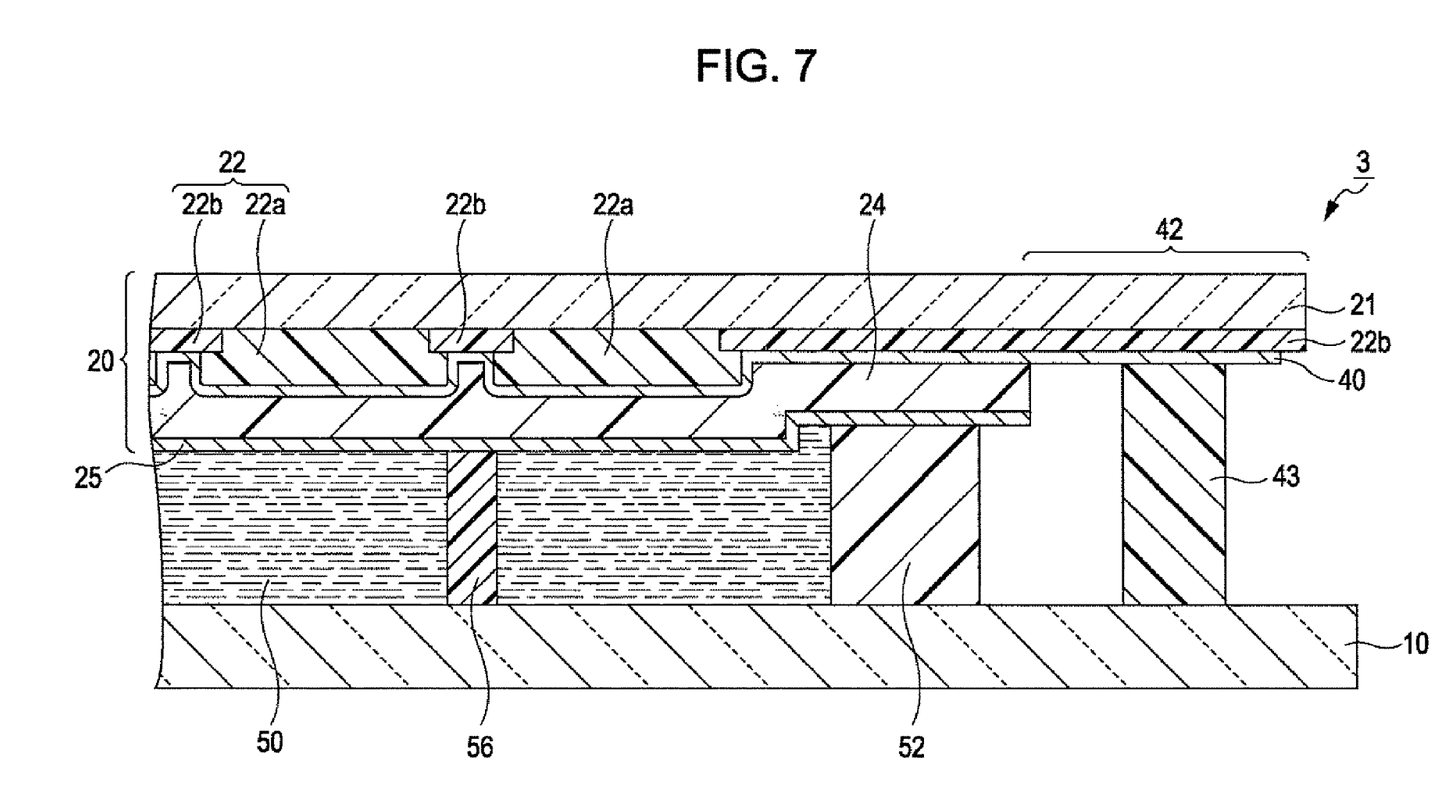
FIG. 7 is a simplified crosssectional view of a liquid crystal device according to a third embodiment of the invention.

Next, a liquid crystal device 3 according to a third embodiment of the invention will be described. FIG. 7 is a simplified cross-sectional view of the liquid crystal device 3 according to the third embodiment of the invention, which corresponds to FIG. 6 in the second embodiment. The liquid crystal device 3 according to the present embodiment has a similar configuration to the liquid crystal device 2 according to the second embodiment, except that the light shielding layer 22b, the coloring layer 22a, and the electrostatic shielding layer 40 are arranged differently on the counter substrate 20. Therefore, in the description of the present embodiment, drawings corresponding to FIGS. 1 to 4 are omitted, and the respective elements formed on the element substrate body 11, such as TFTs 30, will be omitted.

As illustrated in the drawing, in the color filter layer 22, the coloring layer 22a is thicker than the light shielding layer 22b, and a portion of the peripheral edge of the coloring layer 22a overlaps with the neighboring light shielding layer 22b. A portion of the light shielding layer 22b is exposed between the neighboring coloring layers 22a. The electrostatic shielding layer 40 is formed so as to cover the surface of the color filter layer 22. That is to say, the electrostatic shielding layer 40 of the liquid crystal device 3 is formed on the side of the light shielding layer 22b and the coloring layer 22a disposed close to the liquid crystal layer 50, and only the overcoat layer 24 and the second alignment film 25 are disposed between the electrostatic shielding layer 40 and the liquid crystal layer 50.

On the surface of the counter substrate 20, similar to the liquid crystal device 2, the exposed portions 42 are formed in which the overcoat layer 24 is removed, so that the electrostatic shielding layer 40 and the conductive members 43 are electrically connected at the exposed portions 42.

The liquid crystal device 3 according to the present embodiment can provide substantially all the characteristics (advantages) of the liquid crystal device 2 according to the second embodiment. That is to say, the liquid crystal device 3 can provide high damage resistance and suppress image irregularities due to static electricity. Moreover, gap control is easy, the exposed portions 42 can be processed with ease, and reliability can be improved.

Moreover, the liquid crystal device 3 according to the present embodiment has characteristics that it is easy to design. As described above, as the coloring layer 22a is not disposed between the electrostatic shielding layer 40 and the liquid crystal layer 50, it is possible to prevent the thickness of the coloring layer 22a from affecting the function of shielding static electricity. Therefore, it is possible to set the thickness of the electrostatic shielding layer 40 without taking the thickness of the coloring layer 22a into consideration, making the design works easy.

Modified Embodiment

Figure 9A:
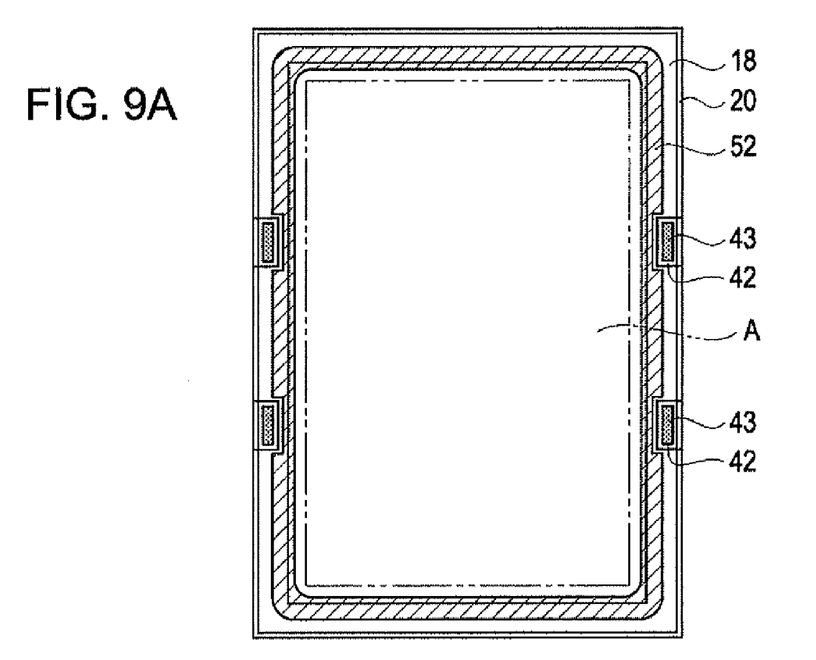
FIGS. 9A and 9B are simplified plan views illustrating the forming position of an exposed portion in a liquid crystal device according to a modified embodiment.
Figure 9B:
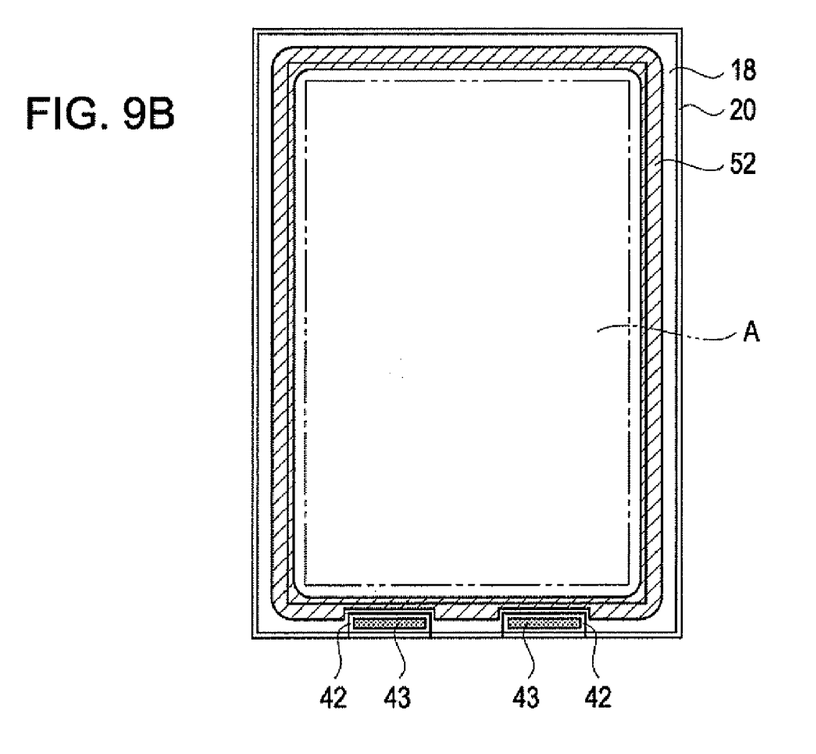

Next, a modified embodiment of the invention will be described. FIGS. 9A and 9B are simplified plan views illustrating the forming positions of the exposed portions 42 in a liquid crystal device according to the modified embodiment. The liquid crystal devices according to the modified embodiment have similar configurations as the liquid crystal device according to the above-described embodiments. That is to say, the drawing lines 18 and the sealing member 52 are formed so as to surround the display area A in a plan view, and the electrostatic shielding layer (not illustrated) and the drawing lines 18 are connected via the conductive members 43 at the exposed portions 42 which are formed on the side of the counter substrate 20. However, the forming positions of the exposed portions 42 are different from the liquid crystal device according to the respective embodiments.

In the liquid crystal device illustrated in FIG. 9A, the exposed portions 42 are not formed at the corner portions of the substrate (the counter substrate 20) but are formed at two locations; each side of a pair of opposing sides. The exposed portions 42 may be formed at three locations per one side. By having such a configuration, the electrical connection between the drawing lines 18 and the electrostatic shielding layer 40 can be realized in a liquid crystal device in which the corner portions are used for other purposes. Moreover, by having such a configuration, it is possible to further increase the cross-sectional area of the conductive members 43.

In the liquid crystal device illustrated in FIG. 9B, the exposed portions 42 are formed on the side where the substrate extension portion 10a (see FIG. 2) is formed. Since the driving IC 207 (see FIG. 2) is mounted at such a position, there is an enough space between the display area A and the outer circumference of the substrate, and thus, the exposed portions 42 can be formed with ease.

Electronic Apparatus

Figure 8:
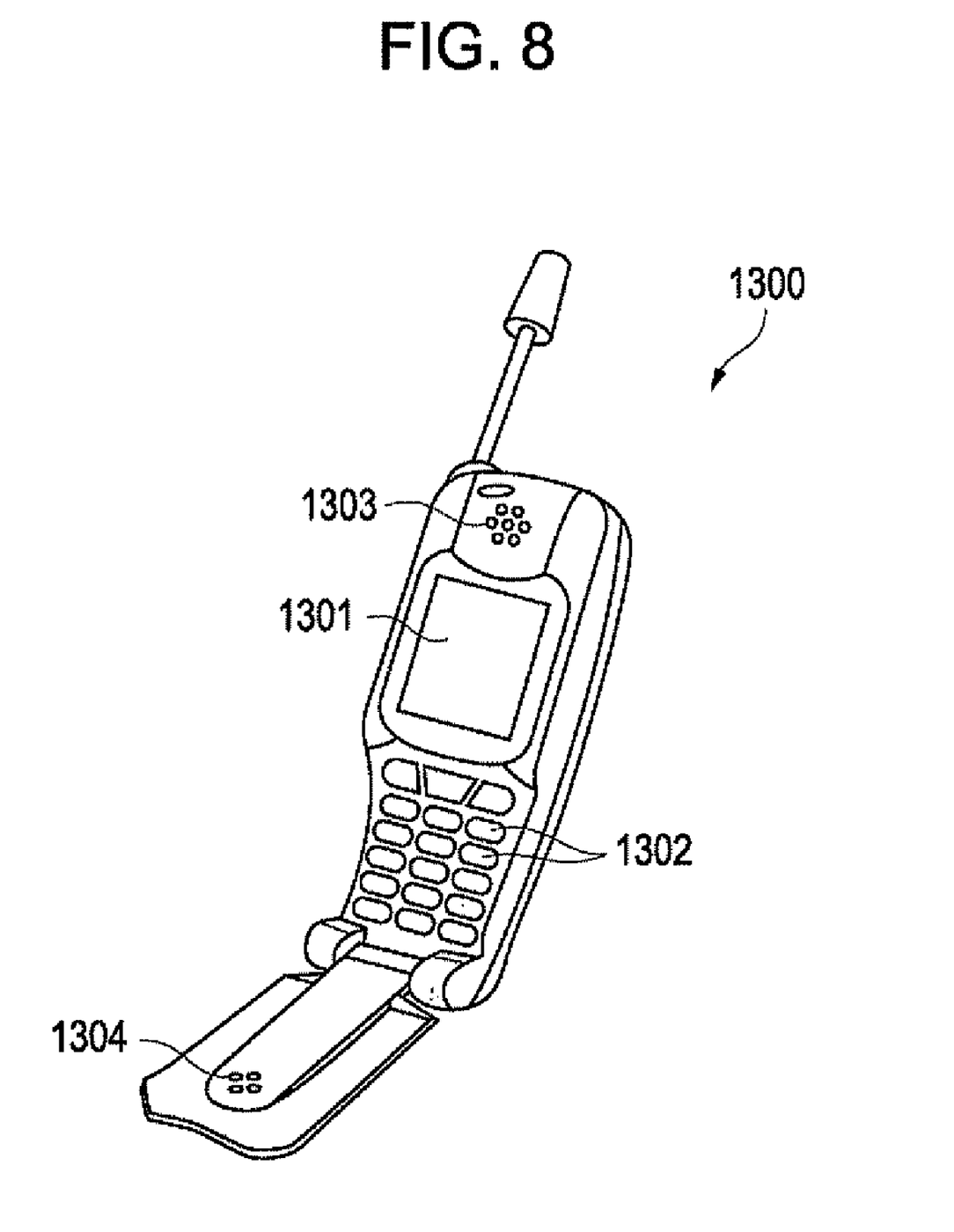
FIG. 8 is a perspective view illustrating an example of an electronic apparatus according to the invention.

Next, an embodiment of an electronic apparatus according to the invention will be described. FIG. 8 is a perspective view illustrating an example of an electronic apparatus according to the invention. The cellular phone (electronic apparatus) 1300 illustrated in FIG. 8 includes a small-sized display portion 1301 as the liquid crystal device of the invention, a plurality of operation buttons 1302, an ear piece 1303, and a mouth piece 1304. Therefore, it is possible to provide the cellular phone 1300 having the display portion which is constructed by the liquid crystal device according to the invention and is thus capable of suppressing display irregularities due to static electricity.

The liquid crystal device according to the respective embodiments is not limited to the cellular phone. The liquid crystal device may be suitably used as an image display unit of an electronic book, a projector, a personal computer, a digital-still camera, a television receiver, a view finder type or monitor direct vision-type video tape recorder, a car navigation apparatus, a pager, an electronic pocket book, a calculator, a word processor, a work station, a television phone, a POS terminal, and an apparatus having a touch panel. By having such a configuration, it is possible to provide an electronic apparatus having a display portion capable of reducing image irregularities due to static electricity and providing high display quality.

Although the exemplary embodiments of the invention have been described with reference to the accompanying drawings, it should be understood that the invention is not limited to such embodiments. Various shapes or combinations of respective constituent elements illustrated in the above-described embodiments are merely examples, and various changes may be made depending on design requirements or the like without departing from the spirit or scope of the invention.

The entire disclosure of Japanese Patent Application Nos. 2008-252588, filed Sep. 30, 2008 and 2009-130078, May 29, 2009 are expressly incorporated by reference herein.

What is claimed is:

1. A lateral electric field mode liquid crystal device comprising:
    a first substrate having pixel electrodes and common electrodes which are provided on one surface thereof;
    a second substrate disposed so as to face that the surface of the first substrate with a predetermined distance therebetween;
    a liquid crystal layer sandwiched between the first substrate and the second substrate; and
    a loop-shaped sealing member disposed so as to surround the liquid crystal layer, with the liquid crystal device driving the liquid crystal layer by an electric field generated between the pixel electrodes and the common electrodes,
    wherein on the surface of the first substrate disposed close to the liquid crystal layer, a driving circuit and wirings electrically connected to the driving circuit are formed,
    wherein on the surface of the second substrate disposed close to the liquid crystal layer, an electrostatic shielding layer and an insulating layer including a light shielding layer and an overcoat layer are formed,
    wherein the wirings and the electrostatic shielding layer are electrically connected via a conductive member which is formed in an exposed portion of the insulating layer at the outer circumference of the sealing member, and
    wherein the exposed portion is provided by removing the light shielding layer and the overcoat layer around the conductive member.

2. The liquid crystal device according to claim 1, wherein the insulating layer is a laminate of a color filter layer and an overcoat layer formed on the side of the color filter layer disposed close to the liquid crystal layer, where the color filter layer includes a coloring layer which is formed so as to overlap the pixel electrodes in a plan view, and a light shielding layer which is formed in an area where the coloring layer is not formed.

3. The liquid crystal device according to claim 2,
    wherein the conductive member and the wirings are connected via a conductive film which is formed on the side of the wirings disposed close to the liquid crystal layer.

4. The liquid crystal device according to claim 1, wherein the insulating layer is a laminate of a coloring layer which is formed so as to overlap with the pixel electrodes in a plan view, and an overcoat layer which is formed on a side of the coloring layer disposed close to the liquid crystal layer.

5. The liquid crystal device according to claim 1,
    wherein a color filter layer is formed on the surface of the second substrate disposed close to the liquid crystal layer, where the color filter layer includes a coloring layer which is formed so as to overlap with the pixel electrodes in a plan view, and a light shielding layer which is formed in an area where the coloring layer is not formed, and
    wherein the insulating layer is an overcoat layer which is formed on the side of the color filter layer disposed close to the liquid crystal layer.

6. An electronic apparatus comprising the liquid crystal device according to claim 1.

* * * * *